Figure 1:
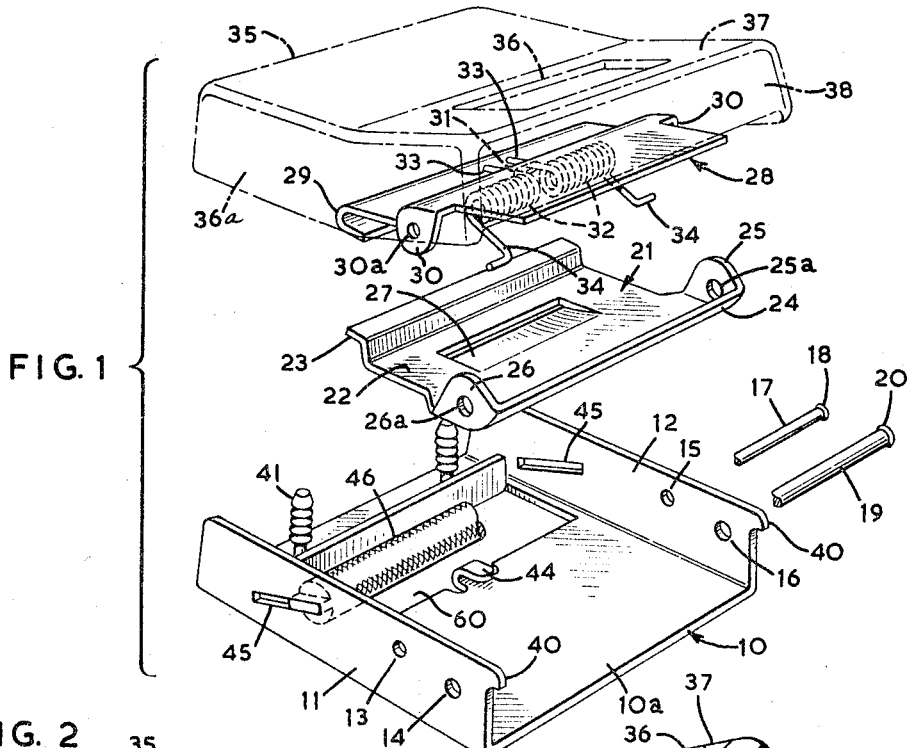

Sept. 6, 1966  F. H. HUMPHREY  3,270,388
BUCKLE FOR A SAFETY BELT
Filed June 22, 1965

INVENTOR.
FREDERICK H. HUMPHREY
BY
ATTORNEY

United States Patent Office 3,270,388
Patented Sept. 6, 1966

3,270,388
BUCKLE FOR A SAFETY BELT
Frederick H. Humphrey, Markham, Ontario, Canada, assignor to Alnwick Investments Limited, Nassau, Bahamas
Filed June 22, 1965, Ser. No. 465,976
10 Claims. (Cl. 24—230)

This invention relates to a buckle for a belt, particularly a safety belt for use in an automotive vehicle or aeroplane.

Safety belt buckles commonly are of what could be referred to as a "clam shell" construction, commonly called lever type construction in the trade. In other words, they employ two members which pivot on each other in "clam shell" fashion. When the "clam shell" is opened, the tongue of the belt which is inserted and held in the "clam shell" is released from engagement with a catch within the "clam shell." Commonly the two members forming the "clam shell" constitute the outer parts of the buckle. Such buckles suffer the disadvantage that they can be opened accidentally quite easily, since opening is achieved merely by lifting one part of the "clam shell" relative to the other, and this part of the "clam shell" can be lifted accidentally by catching on clothing, etc.

It is one object of this invention to provide a buckle which will meet the requirements of all government regulations, standards etc., applicable to safety belts and in which all of the moving parts are enclosed in a housing in such a manner that forces exerted on the housing itself cannot open the buckle.

In brief, in accordance with the broad aspect of this invention, there is provided a belt buckle that includes a base member, first and second lever members, a catch member carried by the first lever member, and means pivotally mounting the first lever member on and above the base member about a first pivot axis for movement of the catch member towards and away from the base member. When the catch member is moved towards the base member, it is adapted to engage a catch engageable part of a tongue of a belt when this tongue is inserted between the base member and the first lever member. The catch member disengages from this catch engageable part when the catch member is moved away from the base member. The second lever member is pivotally mounted on the side of the first lever member remote from the base member about a second pivot axis which is parallel to the first pivot axis. Parts of the first and second lever members are coupled together at a point which is spaced from but on the same side of both of the pivot axes of the lever members, so that movement of the end of the second lever member on the other side of the second pivot axis towards the first lever member lifts the part of the first lever member which carries the catch member. Spring means bias the aforementioned one end of the second lever member away from the base member and bias the aforementioned part of the first lever member towards the base member. A cap member is provided and has an opening therein. Means secure the cap member fixed in position on the base member with the cap member positioned over the first and second lever members, but with the aforementioned one end of the second lever member being accessible through the opening in the cap member.

Figure 2:
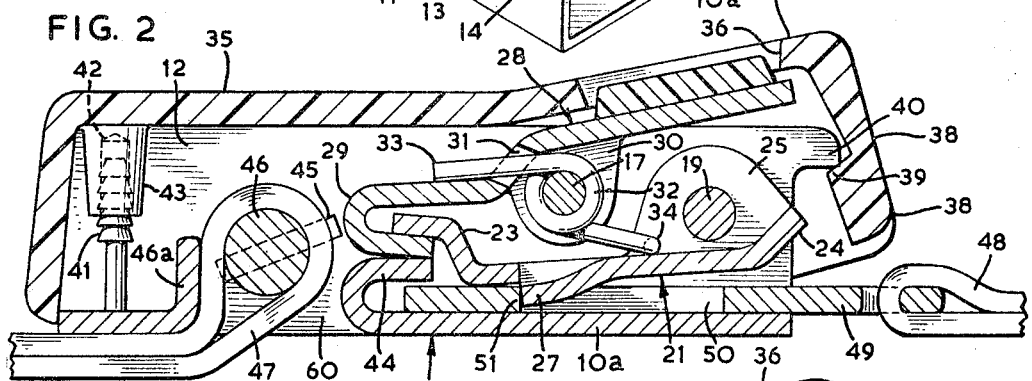
Figure 3:
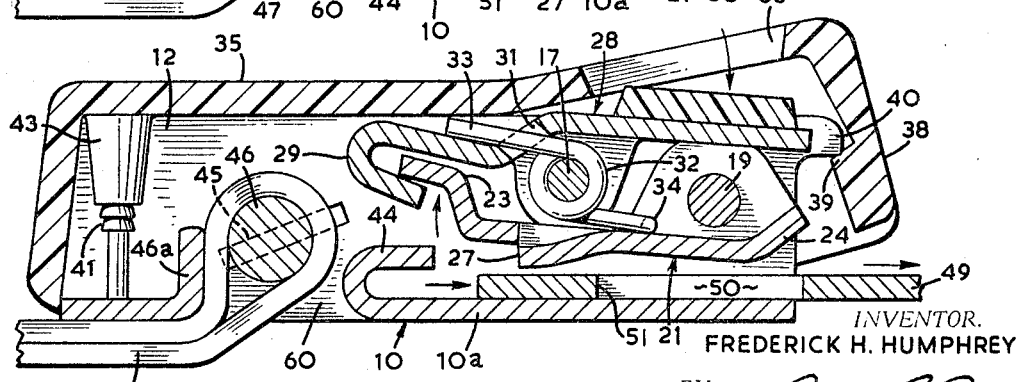

This invention will become more apparent from the following detailed description, taken in conjunction with the appended drawings, in which:

FIGURE 1 is an exploded perspective view of a buckle embodying this invention with the cap member thereof shown in phantom outline, FIGURE 2 is a section taken along the longitudinal axis of the buckle shown in FIGURE 1 when in assembled position and with the buckle closed, and FIGURE 3 is a view similar to FIGURE 2 but showing the buckle opened.

Referring now to the drawings, a buckle embodying this invention includes a base member 10 which may be generally U shaped in configuration having spaced-apart, upstanding, parallel side walls 11 and 12 and a cross piece 10a extending therebetween, it being understood that side walls 11 and 12 and cross piece 10a are integral and may be formed, for example, by stamping a suitable sheet of a metal such as steel.

Towards the front end of base member 10 there are openings 13, 14, 15 and 16 in side walls 11 and 12, openings 13 and 15 being aligned with each other, and openings 14 and 16 being aligned with each other. Passing through openings 13 and 15 is a pin 17 which is headed, as at 18, at both ends thereof and thereby is retained on base member 10. Passing through openings 14 and 16 is a pin 19 headed, as at 20, at both ends thereof, and thereby retained on base member 10. Pins 17 and 19 may be free to rotate, or they may be fixed to side walls 11 and 12. It will be noted that pins 17 and 19 are spaced-apart and parallel to each other.

A lever member 21 is provided, and may be a metal stamping, for example. Lever member 21 includes a generally flat portion 22, a generally Z shaped end portion 23, and an upwardly inclined end portion 24. Lever member 21 also has spaced-apart ears 25 and 26 in which openings 25a and 26a respectively are provided. Pin 19 extends through these openings in ears 25 and 26 so as to pivotally mount lever member 21 above cross piece 10a about a pivot axis adjacent one end of lever member 21. In flat portion 22 of lever member 21 there is formed a catch member 27, this catch member constituting a part of lever member 21 but being cut on three sides therefrom and bent downwardly out of the plane of flat portion 22, as best shown in FIGURES 2 and 3.

A second lever member 28, which also may be a metal stamping, is provided. Lever member 28 is of generally Z shaped configuration but has a hook shaped end portion 29 which turns under and catches a part of the Z shaped end portion 23 of lever member 21, as best shown in FIGURES 2 and 3. Lever member 28 also has spaced-apart ears 30 each provided with an opening 30a through which pin 17 extends so as to pivotally mount lever member 28 intermediate its ends on the side of lever member 21 remote from cross piece 10a but about a pivot axis which is parallel to the pivot axis defined by pin 19. It will be noted that lever member 28 has an opening 31 therein, the purpose of which will become more evident hereinafter. Attention is directed to the fact that lever members 21 and 28 are coupled together (by means of hook shaped end portion 29 and Z shaped end portion 23) at a point which is spaced from but on the same side, i.e., the lefthand side in FIGURES 2 and 3, of both of pins 17 and 19.

Coiled about pin 17 are two coil springs 32 each having ends 33 and 34, although only one coil spring may be employed, if desired. Ends 33 pass through opening 31 and bear against the part of lever member 28 on the lefthand side of pin 17, while ends 34 bear against flat portion 22 of lever member 21. Thus, it may be seen that springs 32 bias the part of lever member 28 on the righthand side of pin 17 away from cross piece 10a, while they also bias the flat portion 22 of lever member 21 carrying catch member 27 towards cross piece 10a.

Securely fastened to base member 10 is a cap member 35 which may be formed of plastic or steel, for example. Cap member 35 has a generally rectangular opening 36 provided in an upwardly inclined front part 37 thereof. Cap member 35 is fixed in position on base member 10 with the cap member positioned over lever members 21 and 28 and cross piece 10a and with the side walls 36a of cap member 35 positioned outside of and enclosing side walls 11 and 12. As best shown in FIGURES 2 and 3, however, the part of lever member 28 on the righthand side of pin 17 registers with and is accessible through opening 36.

Cap member 35 is secured to base member 10 by having the front wall 38 of cap member 35 provided with a shoulder 39 that engages projections 40 extending forwardly from side walls 11 and 12, and also by means of "pine trees" 41 that extend into openings 42 in projections 43 formed integral with cap 35, the "pine trees" 41 biting into the side walls defining openings 42 to resist any attempt to lift cap member 35 from base member 10.

Base member 10, or, more specifically, cross piece 10a thereof, is provided with a hook 44, the purpose of which will become more apparent hereinafter.

Slidably mounted in inclined slots 45 in side walls 11 and 12 is a knurled pin 46. One part 47 of the webbing of a seat belt passes through an opening 60 in cross piece 10a and is looped around pin 46. When this part 47 of the webbing is tightened, pin 46 slides to the position shown in FIGURES 2 and 3, thus clamping the webbing between pin 46 and an upturned flange 46a so as to prevent sliding of the webbing over pin 46. The length of the webbing may be adjusted, however, by sliding pin 46 towards the front of the buckle, thereby freeing the webbing for movement about pin 46. The means which have just been described and which serve to clamp webbing 47 and permit it to be adjusted in length are conventional in nature and, per se, form no part of this invention.

The other part 48 of the webbing is shown in FIGURE 2 and is fixed to a metal tongue 49 having an opening 50 therein, tongue 49 being provided with a shoulder 51 that is adapted to engage catch member 27.

The normal position of the various components of a buckle embodying this invention is as shown in FIGURE 2. In order to fasten the seat belt, it is only necessary to insert tongue 49 between lever member 21 and cross piece 10a. Upturned end 24 of lever member 21 together with front wall 38 of cap member 35 ensures that tongue 49 will be inserted properly into the buckle. The leading edge of tongue 49 engages catch member 27 forcing lever member 21 upwardly until tongue 49 is inserted to the position shown in FIGURE 2, at which point springs 32 cause catch member 27 to drop into opening 50 and engage shoulder 51. The buckle now is closed, and the seat belt fastened securely. Because catch member 27 is below pin 19, any attempt to pull tongue 49 from the buckle results in catch member 27 being forced even more strongly against shoulder 51.

It will be noted from FIGURE 2 that tongue 49 extends into hook 44.

When it is desired to open the buckle and release the seat belt, pressure is exerted on the part of lever member 28 to the right of pin 17 in the direction shown by the arrow in FIGURE 3. This is done by the operator inserting his finger through opening 36 and depressing lever member 28. Hook shaped end 29 of lever member 28 lifts lever member 21 and catch member 27, the latter being lifted above tongue 49, thereby freeing catch member 27 from engagement with shoulder 51 and permitting withdrawal of tongue 49. If the engagement between catch member 27 and shoulder 51 should result in lifting of tongue 49, this is overcome by hook 44 which restrains the tongue from movement away from cross piece 10a when catch member 27 is lifted.

By arranging the lever members and their pivot pins in the manner shown in the drawings, a mechanical advantage on opening of about 3 to 1 can be obtained. By rearranging the relative position of the pivot pins, the mechanical advantage can be varied at will, e.g., to 2.5 to 1 or 2 to 1.

Since springs 32 bear against both lever members 21 and 28, rattling of these lever members is minimized. It will be appreciated, however, that springs 32 may be arranged other than about pin 17 as long as the springs bias catch member 27 towards cross piece 10a and the end of lever member 28 to the right of pivot pin 17 away from cross piece 10a.

It will be noted that cap member 35 is fixed in position and does not move when the buckle is opened or closed. Therefore, if cap member 35 becomes caught in clothing or forces are exerted thereon accidentally, this cannot cause the buckle to open.

It also will be noted that there is no fulcrum in cap member 35, as has been the case in prior art "clam shell" type buckles, so that the bearing pressure of a pivot pin on plastic or metal cap 35 is avoided.

It will be appreciated that base member 10 may be of a different configuration than that shown. Indeed, it may just be a plate with projecting tabs on which lever members 21 and 28 are pivotably mounted.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly co-operative equivalents are therefore intended to be embraced by those claims.

The embodiments of the invention in which an exclusive property or privilege is claimed are defined as follows:

1. A buckle for a belt, said buckle comprising a base member; first and second lever members; a catch member carried by said first lever member; means pivotably mounting said first lever member on and above said base member about a first pivot axis for movement of said catch member towards and away from said base member, said catch member when moved towards said base member being adapted to engage a catch engageable part of a tongue of a belt when the tongue is inserted between said base member and said first lever member and to disengage from the catch engageable part moved away from said base member; means pivotably mounting said second lever member on the side of said first lever member remote from said base member about a second pivot axis parallel to said first pivot axis; parts of said first and second lever members being coupled together at a point spaced from but on the same side of both of said pivot axes so that movement of the end of said second lever member on the other side of said second pivot axis towards said first lever member lifts the part of said first lever member carrying said catch member; spring means biasing said one end of said second lever member away from said base member and biasing said part of said first lever member towards said base member; a cap member having an opening therein; and means for securing said cap member fixed in position on said base member with said cap member positioned over said first and second lever members but with said one end of said second lever member being accessible through the opening in said cap member.

2. A buckle according to claim 1 including a tongue retaining member carried by said base member and adapted to engage said tongue of said belt when said tongue is inserted between said base member and said first lever member and restrain said tongue against movement away from said base member when said part of said first lever member is lifted by said second lever member.

3. A buckle according to claim 1 wherein said spring means is a coil spring having two ends, said coil spring being coiled about said second pivot axis, one of said ends of said coil spring bearing against said second lever member and the other of said ends of said coil spring bearing against said first lever member.

4. A buckle according to claim 1 wherein said first pivot axis is located adjacent an end of said first lever member remote from the point where said first and second lever members are coupled together, and wherein said second pivot axis is located between the ends of said second lever member.

5. A buckle according to claim 4 wherein said point where said first and second lever members are coupled together is at ends of both said first and second lever members.

6. A buckle according to claim 5 wherein said first and second lever members are coupled together by a generally hook-shaped member carried by one of said lever members at one of its ends and catching one of the ends of the other of said lever members.

7. A buckle according to claim 1 wherein said catch member is formed integral with the said first lever member and projects away from said first lever member towards said base member.

8. A buckle according to claim 7 including a tongue retaining member carried by said base member and adapted to engage said tongue of said belt when said tongue is inserted between said base member and said first lever member and restrain said tongue against movement away from said base member when said part of said first lever member is lifted by said second lever member, wherein said first pivot axis is located adjacent an end of said first lever member remote from the point where said first and second lever members are coupled together, wherein said second pivot axis is located between the ends of said second lever member, wherein said point where said first and second lever members are coupled together is at ends of both said first and second lever members, and wherein said first and second lever members are coupled together by a generally hook-shaped member carried by one of said lever members at one of its ends and catching one of the ends of the other of said lever members.

9. A buckle according to claim 8 wherein said spring means is a coil spring having two ends, said coil spring being coiled about said second pivot axis, one of said ends of said coil spring bearing against said second lever member and the other of said ends of said coil spring bearing against said first lever member.

10. A buckle for a belt, said buckle comprising a generally U-shaped member having spaced-apart upstanding side walls and a cross-piece extending therebetween; first and second lever members; a catch member carried by said first lever member; first and second spaced-apart parallel pins extending between and mounted in said side walls and positioned above said cross-piece; said first lever member being mounted on said first pin for pivoting movement of said catch member towards and away from said cross-piece, said catch member when moved towards said cross-piece being adapted to engage a catch engageable part of a tongue of a belt when the tongue is inserted between said cross-piece and said first lever member and to disengage from the catch engageable part when moved away from said cross-piece; said second lever member being mounted on said second pin for pivoting of said second lever member about an axis parallel to said first pin and being positioned on the side of said first lever member remote from said cross-piece; parts of said first and second lever members being coupled together at a point spaced from but on the same side of both of said pivot pins so that movement of the end of said second lever member on the other side of said second pin towards said first lever member lifts the part of said first lever member carrying said catch member; spring means biasing said one end of said second lever member away from said cross-piece and biasing said part of said first lever member towards said cross-piece; a cap member having an opening therein; and means for securing said cap member fixed in position on said U-shaped member with said cap member positioned over said first and second lever members and said cross-piece and enclosing said side walls, but with said one end of said second lever member being accessible through the opening in said cap member.

References Cited by the Examiner
UNITED STATES PATENTS 3,189,966 6/1965 Craven.
3,226,791 1/1966 Carter.

BERNARD A. GELAK, *Primary Examiner.*